US011860848B2

(12) United States Patent
Borchmann et al.

(10) Patent No.: US 11,860,848 B2
(45) Date of Patent: Jan. 2, 2024

(54) ENCODER-DECODER TRANSFORMER FOR TABLE GENERATION

(71) Applicant: APPLICA SP. Z O.O., Warsaw (PL)

(72) Inventors: Lukasz Konrad Borchmann, Poznan (PL); Tomasz Dwojak, Poznan (PL); Lukasz Slawomir Garncarek, Warsaw (PL); Dawid Andrzej Jurkiewicz, Poznan (PL); Michal Waldemar Pietruszka, Cracow (PL); Gabriela Klaudia Palka, Poznan (PL); Karolina Szyndler, Szczecin (PL); Michal Turski, Warsaw (PL)

(73) Assignee: Applica sp. z o.o., Warsaw (PL)

( * ) Notice: Subject to any disclaimer, the term of this patent is extended or adjusted under 35 U.S.C. 154(b) by 0 days.

(21) Appl. No.: 18/152,083

(22) Filed: Jan. 9, 2023

(65) Prior Publication Data

US 2023/0297554 A1 Sep. 21, 2023

Related U.S. Application Data

(60) Provisional application No. 63/267,174, filed on Jan. 26, 2022.

(51) Int. Cl.
*G06F 16/22* (2019.01)
*G06F 16/21* (2019.01)

(52) U.S. Cl.
CPC ........ *G06F 16/2282* (2019.01); *G06F 16/211* (2019.01)

(58) Field of Classification Search
CPC .................................. G06F 16/2282
USPC ........................................................ 707/802
See application file for complete search history.

(56) References Cited

U.S. PATENT DOCUMENTS

| 10,268,749 | B1* | 4/2019 | Roy | G06F 16/285 |
|---|---|---|---|---|
| 2014/0280193 | A1* | 9/2014 | Cronin | G06F 16/24558 |
| | | | | 707/741 |
| 2018/0060364 | A1* | 3/2018 | Zengerle | G06F 16/211 |
| 2018/0060734 | A1* | 3/2018 | Beller | G06N 20/00 |
| 2019/0311301 | A1* | 10/2019 | Pyati | G06F 16/901 |
| 2020/0218506 | A1* | 7/2020 | Nilsson | G06F 16/221 |
| 2020/0243174 | A1* | 7/2020 | Burgess | G06F 16/22 |
| 2021/0089472 | A1* | 3/2021 | Ishii | G06F 12/121 |
| 2021/0311937 | A1* | 10/2021 | Bordawekar | G06F 16/24556 |
| 2022/0058171 | A1* | 2/2022 | He | G06F 17/18 |
| 2022/0300711 | A1* | 9/2022 | Elisco | G06F 40/205 |
| 2022/0342857 | A1* | 10/2022 | Natesan | G06N 20/00 |
| 2023/0057414 | A1* | 2/2023 | Larkin | G06F 16/90344 |

* cited by examiner

*Primary Examiner* — Muluemebet Gurmu
(74) *Attorney, Agent, or Firm* — Schwegman Lundberg & Woessner, P.A.

(57) ABSTRACT

Systems and methods for generating tables are provided. The systems and methods perform operations comprising accessing a text document comprising a plurality of strings; processing the text document by a machine learning model to generate a table comprising a plurality of entries that organizes the plurality of strings into rows and columns over a plurality of iterations; and at each of the plurality of iterations, estimating by the machine learning model a first value of a first entry of the plurality of entries based on a second value of a second entry of the plurality of entries that has been determined in a prior iteration.

30 Claims, 8 Drawing Sheets

ENCODER-DECODER TRANSFORMER FOR TABLE GENERATION

CROSS REFERENCE TO RELATED APPLICATION

This application claims the benefit of priority to U.S. Provisional Application Ser. No. 63/267,174, filed on Jan. 26, 2022 and entitled "TRANSFORMER FOR TABLE GENERATION IN ENCODER-DECODER PARADIGM." The contents of this prior application are considered part of this application, and are hereby incorporated by reference herein in its entirety.

TECHNICAL FIELD

Embodiments of the disclosure relate generally to data platforms and databases and, more specifically, to generating tables or databases from documents.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Databases are used by various entities and companies for storing information that may need to be accessed or analyzed. Various operations performed on a database, such as joins and unions, involve combining query results obtained from different data sources (e.g., different tables, possibly on different databases) into a single query result. The various operations that can be performed on the databases are controlled based on access privileges of requesting entities.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
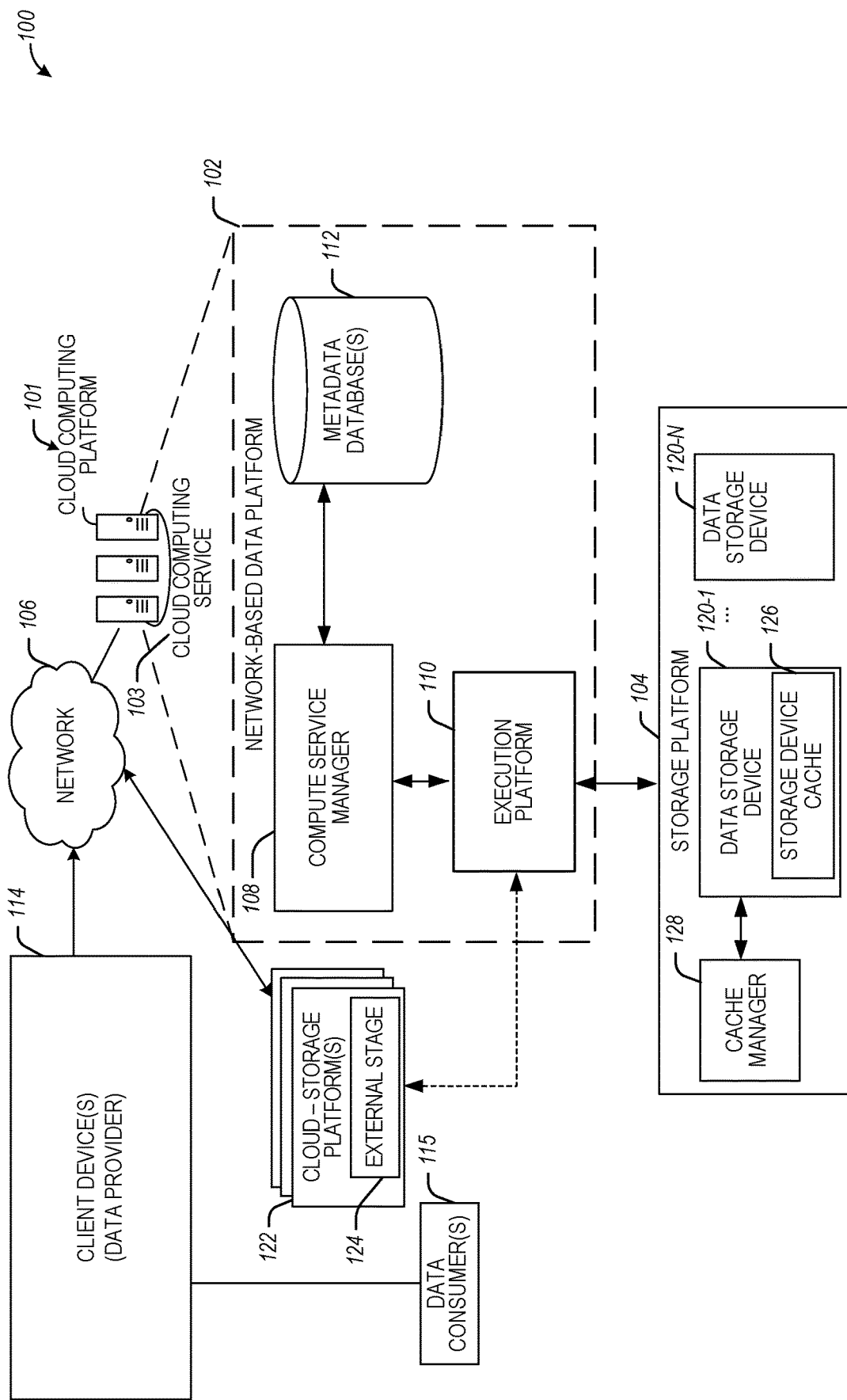
FIG. 1 illustrates an example computing environment that includes a network-based data platform, in accordance with some embodiments of the present disclosure.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. Concerning architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. The data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well. The database can include one or more objects, such as tables, functions, and so forth.

Users and/or executing processes that are associated with a given customer account may, via one or more types of clients, be able to cause data to be ingested into the database, and may also be able to manipulate the data, add additional data, remove data, run queries against the data, generate views of the data, and so forth. In an example implementation of a data platform, a given database is represented as an account-level object within a customer account, and the customer account may also include one or more other account-level objects such as users, roles, and/or the like. Furthermore, a given account-level database object may itself contain one or more objects such as tables, schemas, views, streams, tasks, and/or the like.

A given table may be organized as records (e.g., rows or a collection of rows) that each include one or more attributes (e.g., columns). A data platform may physically store database data in multiple storage units, which may be referred to as blocks, micro-partitions, and/or by one or more other names. In an example, a column of a database can be stored in a block and multiple blocks can be grouped into a single file. That is, a database can be organized into a set of files where each file includes a set of blocks. Consistent with this example, for a given column, all blocks are stored contiguously and blocks for different columns are row aligned. Data stored in each block can be compressed to reduce its size. A block storing compressed data may also be referred to as a "compression block" herein. As referred to herein, a "record" is defined as a collection of data (e.g., textual data) in a file that is organized by one or more fields, where each field can include one or more respective data portions (e.g., textual data, such as strings). Each field in the record can correspond to a row or column of data in a table that represents the records in the file. It should be understood that the terms "row" and "column" are used for illustration purposes and these terms are interchangeable. Data arranged in a column of a table can similarly be arranged in a row of the table.

To simplify and expedite the database generation for a given entity, certain systems perform automated data processing operations on a set of input documents. The data processing operations can recognize text in the documents, infer the type of text, and generate columns of data and entries in a database table using the recognized text. Usually, these systems generate the tables in a top-down and left-to-right approach. In these cases, data entries are generated sequentially one after another in a same sequence. If an entry is unable to be discerned (e.g., the value is unknown) as the table is generated, the typical systems can propagate errors or stop generating the table altogether. This can introduce extreme inefficiencies as data needs to be manually reviewed and corrected intermittently. As such, these systems cannot be applied on a large scale to generate tables for large datasets automatically. The process of manually guiding the systems for database object generation is time consuming, inefficient, and prone to human error, which can result in waste of time, network, and processing device resources.

Aspects of the present disclosure include systems, methods, and devices to address, among other problems, the aforementioned shortcomings of conventional data platforms by intelligently and automatically processing a corpus of documents in a non-sequential manner to populate a table. Particularly, the disclosed model exploits regularities and relationships within the output data and employs a grammar-constrained decoding process to generate a table from a document of text. The disclosed techniques focus on the text-to-table inference with applications to problems such as extraction of line items, key information extraction of multiple properties, joint entity and relation extraction, or knowledge base population. The disclosed techniques provide a model that is end-to-end trainable, thus simplifying the pipeline and reducing the accumulation of errors along the way. At the same time, since extracted data is already in the form the end user requires, one is able to use it directly to the downstream application without further processing steps which improves the overall efficiency of the system.

In particular, the disclosed model provides a decoder capable of modeling spatial relationships between cells in the table. The decoder performs a sequential, grammar-constrained decoding mechanism which generates table content cell-by-cell, in a dynamic, data-dependent order rather than in a top-down and left-to-right sequence. Prior approaches can represent the same output structure in various valid forms. Consequently, valid responses may be penalized during the training phase, expecting only one reference representation. Due to the grammar constrained decoding process of the disclosed techniques, this problem is mitigated without increasing the computational requirements that otherwise might result from use of permutation-invariant loss functions. Additionally, conventional approaches are limited to copying words from the input document and thus cannot perform normalization or return values that are not present in the text explicitly but can be inferred from it. Namely, by knowing relationships between cells and entries of a table, certain entry values can be inferred and populated without actually retrieving the values from the input text itself, for example by process of elimination or inference.

The disclosed model performs a cell-decoding step by sampling all cells at once and then choosing the best-scored cell or cells to be inserted at its location while disregarding others. Then, the disclosed model resets and repopulates the previously discarded cells with new values and again scores the repopulated cells. The model again chooses the best-scored cell or cells to be inserted at its location while disregarding others until all cells of the table are generated and processed in this manner. In this way, the model delays generating the most challenging and complex answers (e.g., values of certain cells or entries) to later stages or iterations and conditions those complex answers on the already generated answers of other cells or entries. Instead of generating the cell values in a top-down, left-to-right manner as done by conventional systems, the disclosed model is pretrained by maximizing the expected log-likelihood of the sequence of cell values over all possible prediction orders.

In some examples, the disclosed techniques access a text document including a plurality of strings. The disclosed techniques process the text document by a machine learning model to generate a table that includes a plurality of entries that organizes the plurality of strings into rows and columns over a plurality of iterations. The disclosed techniques, at each of the plurality of iterations, estimate by the machine learning model, a first value of a first entry of the plurality of entries based on a second value of a second entry of the plurality of entries that has been determined in a prior iteration.

By performing these operations, the data platform increases utilization of execution node processing capability and avoids waste of resources and inefficient use of resources. Specifically, rather than having a human manually create and manage table generation from a corpus of text, which wastes a great deal of time and effort, the disclosed system can automate this process to improve the overall efficiency of the system, which improves the overall functioning of the device.

FIG. 1 illustrates an example computing environment 100 that includes a data platform in the example form of a network-based data platform 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based data platform 102 and a storage platform 104 (also referred to as a cloud storage platform). The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g., structured query language (SQL) queries, analysis), as well as other processing capabilities (e.g., parallel execution of sub-plans, as described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (e.g., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform. The techniques described in this disclosure pertain to non-volatile storage devices that are used for the internal storage location and/or the external storage location.

From the perspective of the network-based data platform 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location. For example, in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based data platform 102 of the cloud computing platform 101 is in communication with the cloud storage platforms 104 and 122 (e.g., Amazon Web Services (AWS)®, Microsoft Azure Blob Storage®, or Google Cloud Storage). The network-based data platform 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based data platform 102.

The network-based data platform 102 comprises a compute service manager 108, an execution platform 110, and one or more metadata databases 112. The network-based data platform 102 hosts and provides data reporting and analysis services to multiple client accounts.

The compute service manager 108 coordinates and manages operations of the network-based data platform 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based data platform 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices that may be used to access services provided by the cloud computing platform 101 (e.g., cloud computing service 103) by way of a network 106, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114 by a data consumer 115. In addition, database operations (joining, aggregating, analysis, etc.) ascribed to a user (consumer or provider) shall be understood to include performing such actions by the cloud computing service 103 in response to an instruction from that user.

Some database operations performed by the compute service manager 108 can include an operation to generate a table or database from one or more input text documents. The compute service manager 108 accesses the text document that includes a plurality of strings. The compute service manager 108 processes the text document by a machine learning model (e.g., a trained artificial neural network (ANN)) to generate a table comprising a plurality of entries that organizes the plurality of strings into rows and columns over a plurality of iterations. At each of the plurality of iterations, the compute service manager 108 estimates by the machine learning model a first value of a first entry of the plurality of entries based on a second value of a second entry of the plurality of entries that has been determined in a prior iteration.

For example, the compute service manager 108 generates a first table instance that includes a first set of entries based on the plurality of strings and, at a first iteration, generates, by the machine learning model, a first plurality of confidence scores for values in each entry of the first set of entries of the first table instance. The compute service manager 108 selects a first subset of the first set of entries of the first table instance based on the first plurality of confidence scores.

Then, at a second iteration, the compute service manager 108 generates a second table instance that includes a second set of entries by resetting the values associated with a remaining set of entries that are excluded from the first subset of the first set of entries and retaining, maintaining or keeping the values associated with the first subset of the first set of entries in the second table instance. The compute service manager 108 processes the second table instance by the machine learning model, to generate a second plurality of confidence scores for each entry of the second set of entries of the second table instance and selects a second subset of the second set of entries based on the second plurality of confidence scores.

The compute service manager 108 is also coupled to one or more metadata databases 112 that store metadata about various functions and aspects associated with the network-based data platform 102 and its users. The metadata database 112 can store the table that provides the mapping between sessions, references to objects, identity of objects, and/or access privileges of the objects. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device. In some embodiments, metadata database 112 is configured to store account object metadata.

Figure 3:
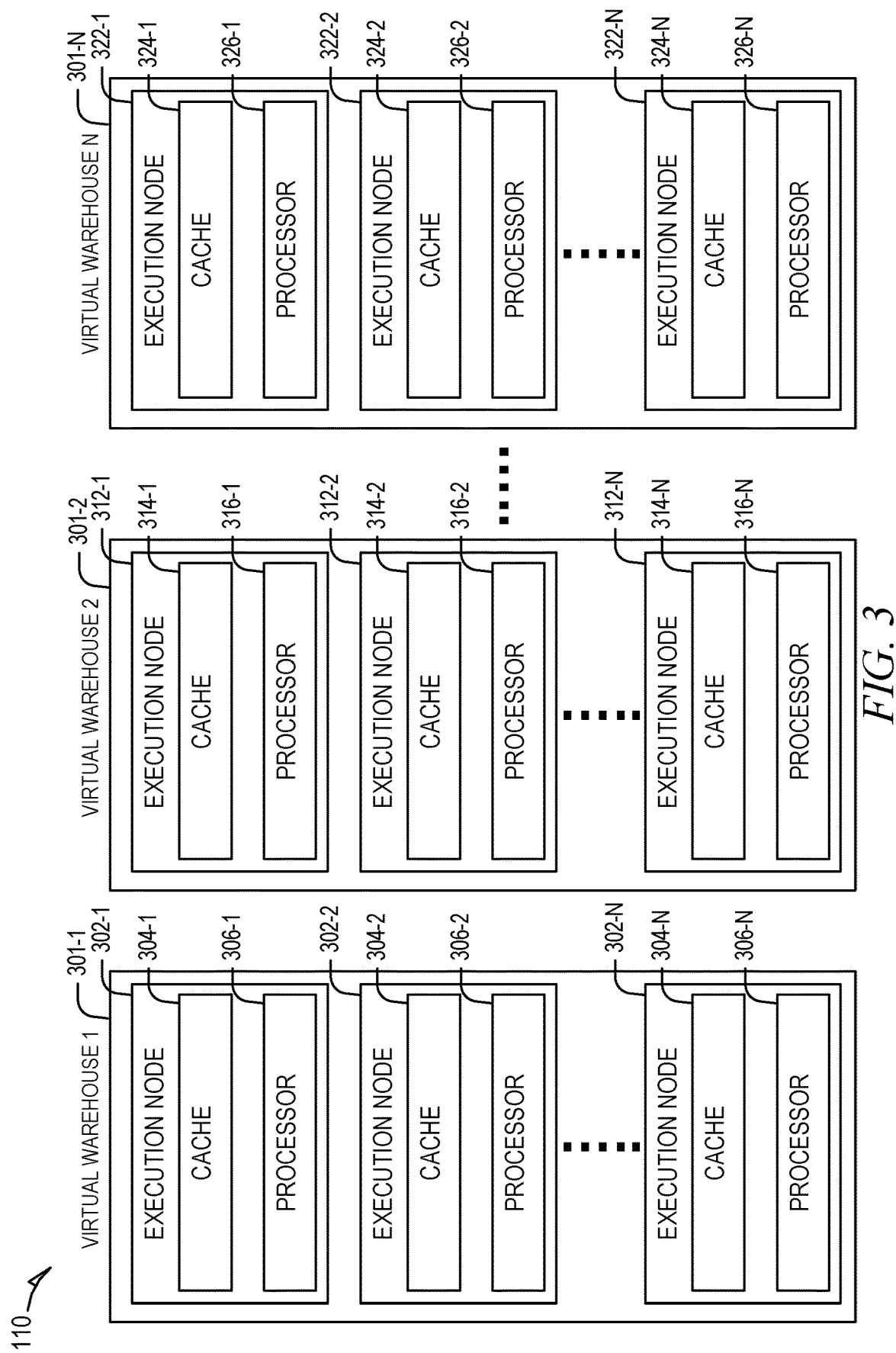
FIG. 3 is a block diagram illustrating components of an execution platform, in accordance with some embodiments of the present disclosure.

The compute service manager 108 is further coupled to the execution platform 110, which provides multiple computing resources that execute various data storage and data retrieval tasks. As illustrated in FIG. 3, the execution platform 110 comprises a plurality of compute nodes. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like.

In some embodiments, at least one storage device cache 126 (e.g., an internal cache) may reside on one or more of the data storage devices 120-1 to 120-N, and at least one external stage 124 may reside on one or more of the cloud storage platforms 122. In some examples, a single storage device cache 126 can be associated with all of the data storage devices 120-1 to 120-N so that the single storage device cache 126 is shared by and can store data associated with any one of the data storage devices 120-1 to 120-N. In some examples, each data storage device of storage devices 120-1 to 120-N can include or implement a separate storage device cache 126. A cache manager 128 handles the transfer of data from the data storage devices 120-1 to 120-N to the storage device cache 126. The cache manager 128 handles the eviction of data from the storage device cache 126 to the respective associated data storage devices 120-1 to 120-N. The storage platform 104 can include one or more hard drives and/or can represent a plurality of hard drives distributed on a plurality of servers in a cloud computing environment.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

The compute service manager 108, metadata database(s) 112, execution platform 110, and storage platform 104 are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based data platform 102. Thus, in the described embodiments, the network-based data platform 102 is dynamic and supports regular changes to meet the current data processing needs.

During a typical operation, the network-based data platform 102 processes multiple jobs (e.g., operators of sub-plans) determined by the compute service manager 108. These jobs (e.g., caller processes) are scheduled and managed by the compute service manager 108 to determine when and how to execute the job. For example, the compute service manager 108 may divide the job into multiple discrete tasks (e.g., caller processes) and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task (e.g., in a storage device cache 126, such as an HDD cache or random access memory (RAM)) and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

According to various embodiments, the execution platform 110 executes a query according to a query plan determined by the compute service manager 108. As part of executing the query, the execution platform performs a table scan in which one or more portions of a database table are scanned to identify data that matches the query. More specifically, the database table can be organized into a set of files where each file comprises a set of blocks (or records) and each block (or record) stores at least a portion of a column (or row) of the database. Each execution node provides multiple threads of execution, and in performing a table scan, multiple threads perform a parallel scan of the set of blocks (or records) of a file, which may be selected from a scan set corresponding to a subset of the set of files into which the database is organized. The query plan, in some cases, can include a request to organize data from a structured or unstructured text file into one or more tables.

The cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
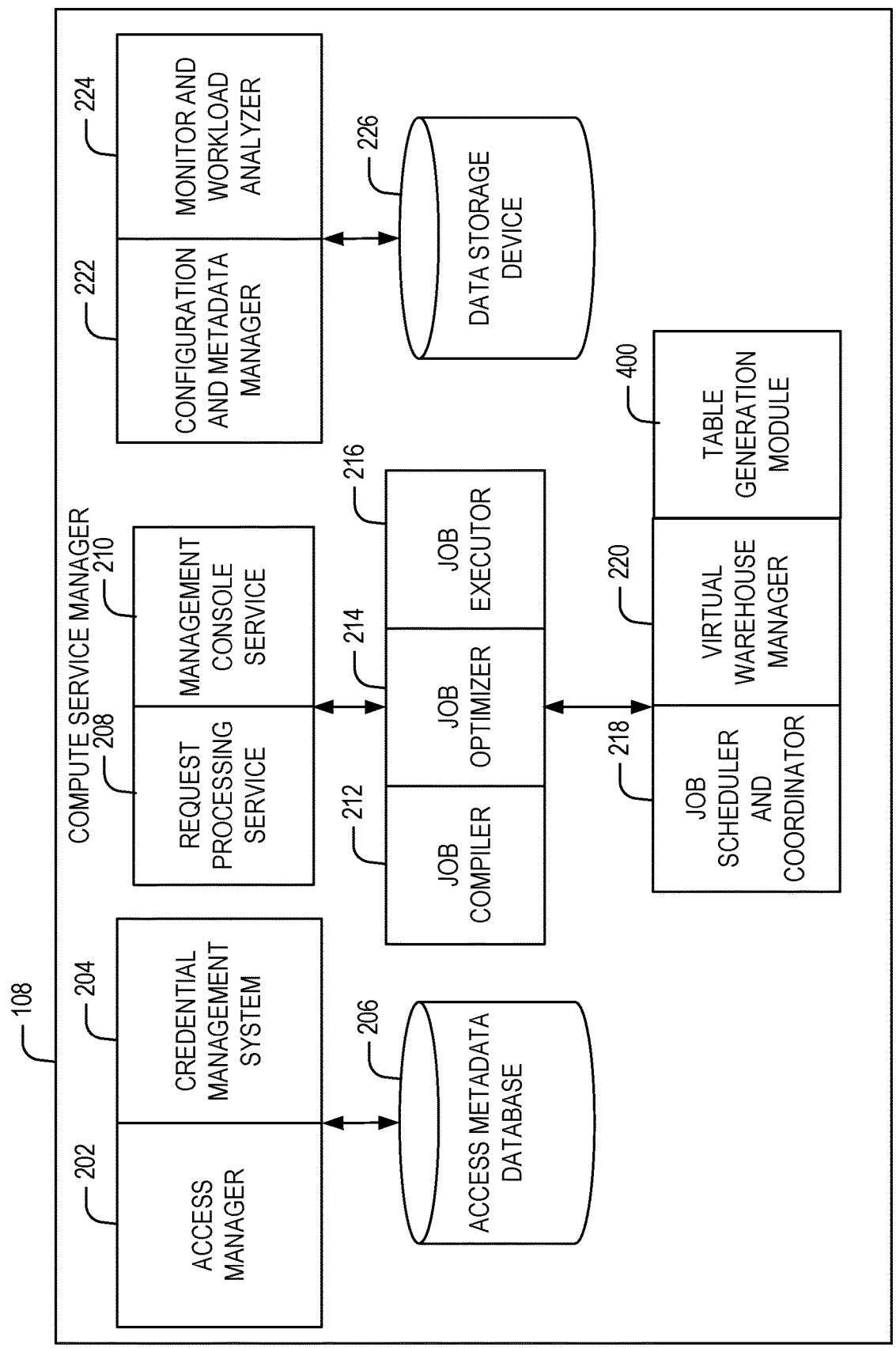
FIG. 2 is a block diagram illustrating components of a compute service manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials to access external resources such as data resources in a remote storage device. As used herein, the remote storage devices may also be referred to as "persistent storage devices," "non-volatile storage devices," "cloud storage devices," or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110, in a storage device cache 126, or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries by one or more execution nodes of the execution platform 110. In some cases, the compute service manager 108 includes a table generation module 400, discussed in more detail below, to handle jobs of the job executor 216.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based data platform 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based data platform 102. For example, data storage device 226 may represent buffers in execution platform 110, storage devices in storage platform 104, or any other storage device.

FIG. 3 is a block diagram illustrating components of the execution platform 110, which can be implemented by any of the virtual warehouses of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing data from any of the data storage devices 120-1 to 120-N and their associated storage device cache 126 (e.g., via a respective lock file) shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104. The techniques described with respect to the cache manager 128 of the storage platform 104 (e.g., an HDD) can be similarly applied to the cache 304-N, 314-N, and 324-N of the execution nodes 302-N, 312-N, and 322-N.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Figure 4:
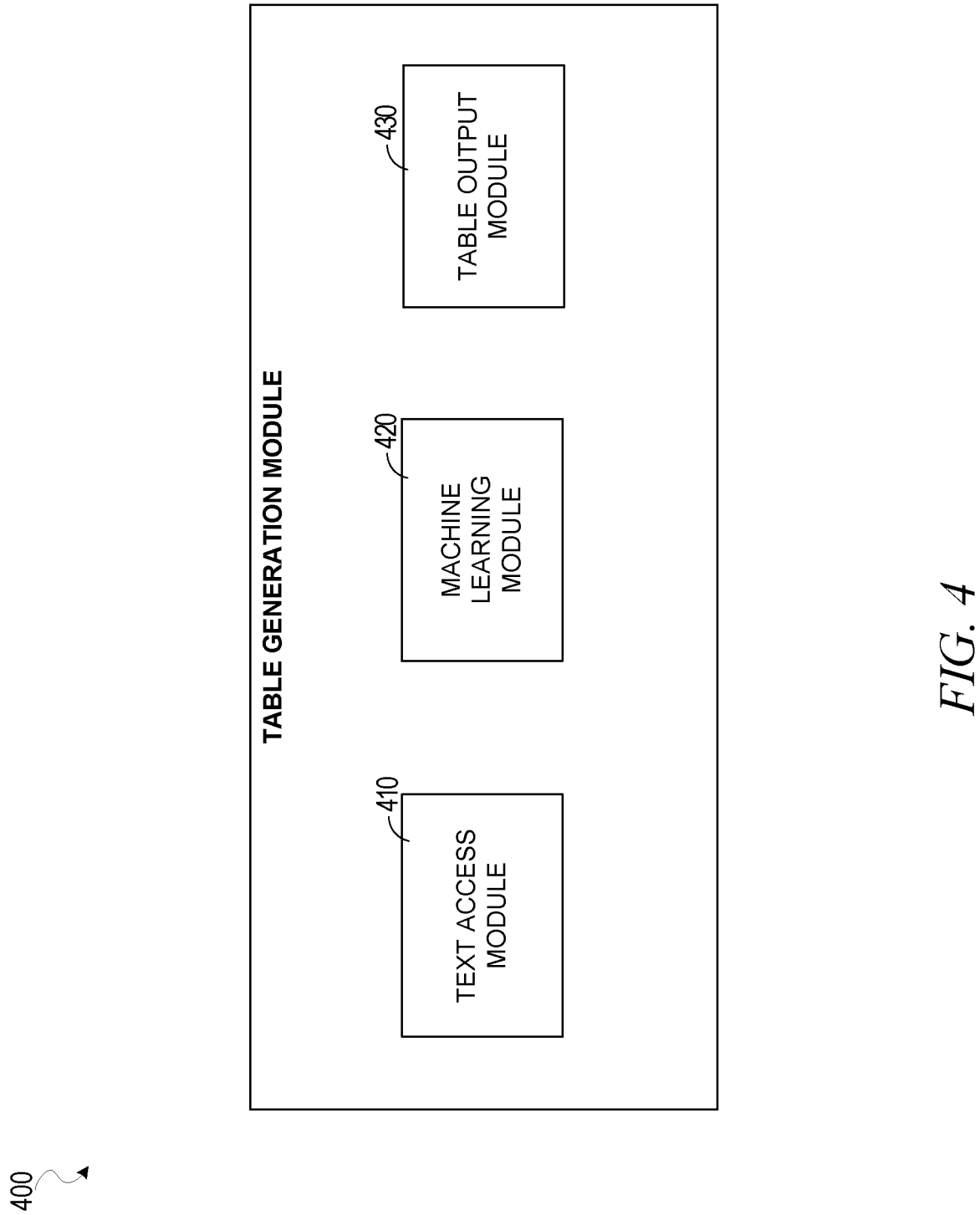
FIG. 4 is a block diagram of a table generation module, in accordance with some embodiments of the present disclosure.

FIG. 4 is a block diagram illustrating an example of the table generation module 400, which can be implemented by any of the virtual warehouses of the execution platform 110, such as the execution node 302-1, compute service manager 108, and/or the request processing service 208, in accordance with some embodiments of the present disclosure. The table generation module 400 can include a text access module 410, a machine learning module 420, and a table output module 430. The table generation module 400 is configured to access one or more text documents that include a plurality of strings. The table generation module 400 processes the text document by a machine learning model (e.g., the machine learning module 420) to generate a table comprising a plurality of entries that organizes the plurality of strings into rows and columns over a plurality of iterations. At each of the plurality of iterations, the table generation module 400 estimates by the machine learning model a first value of a first entry of the plurality of entries based on a second value of a second entry of the plurality of entries that has been determined in a prior iteration.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model (e.g., the machine learning module 420) from example training data in order to make data-driven predictions or decisions expressed as outputs or assessments. Although examples are presented with respect to a few machine-learning tools, the principles presented herein may be applied to other machine-learning tools.

In some examples, different machine-learning tools may be used. For example, Logistic Regression (LR), Naive-Bayes, Random Forest (RF), neural networks (NN), deep NN (DNN), matrix factorization, and Support Vector Machines (SVM) tools may be used for classifying or scoring videos.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine-learning algorithms use features for analyzing the data to generate an assessment. Each of the features is an individual measurable property of a phenomenon being observed. The concept of a feature is related to that of an explanatory variable used in statistical techniques such as linear regression. Choosing informative, discriminating, and independent features is important for the effective operation of the MLP in pattern recognition, classification, and regression. Features may be of different types, such as numeric features, strings, and graphs.

In one example, the features may be of different types and may include one or more of content, concepts, attributes, historical data, and/or user data, merely for example. The machine-learning algorithms use the training data to find correlations among the identified features that affect the outcome or assessment. In some examples, the training data includes labeled data, which is known data for one or more identified features and one or more outcomes, such as detecting communication patterns, detecting the meaning of the message, generating a summary of a message, detecting action items in messages, detecting urgency in the message, detecting a relationship of the user to the sender, calculating score attributes, calculating message scores, determining type of text, categorizing text, computing confidence scores that certain text corresponds to labeled categories or column identifiers, and so forth.

With the training data and the identified features, the machine-learning tool is trained by a machine-learning program training. The machine-learning tool appraises the value of the features as they correlate to the training data. The result of the training is the trained machine-learning program. When the trained machine-learning program is used to perform an assessment, new data is provided as an input to the trained machine-learning program, and the trained machine-learning program generates the assessment as output.

The machine-learning program supports two types of phases, namely a training phase and prediction phase. In training phases, supervised, unsupervised or reinforcement learning may be used. For example, the machine-learning program (1) receives features (e.g., as structured or labeled data in supervised learning) and/or (2) identifies features (e.g., unstructured or unlabeled data for unsupervised learning) in training data. In prediction phases, the machine-learning program uses the features for analyzing input text documents to generate outcomes or predictions or a table that represents the strings of the text in rows and columns, as examples of an assessment.

In the training phase, feature engineering is used to identify features and may include identifying informative, discriminating, and independent features for the effective operation of the machine-learning program in pattern recognition, classification, and regression. In some examples, the training data includes labeled data, which is known data for pre-identified features and one or more outcomes. Each of the features may be a variable or attribute, such as individual measurable property of a process, article, system, or phenomenon represented by a data set (e.g., the training data).

In training phases, the machine-learning program uses the training data to find correlations among the features that affect a predicted outcome or assessment. With the training data and the identified features, the machine-learning program is trained during the training phase at machine-learning program training. The machine-learning program appraises values of the features as they correlate to the training data. The result of the training is the trained machine-learning program (e.g., a trained or learned model).

Further, the training phases may involve machine learning, in which the training data is structured (e.g., labeled during preprocessing operations), and the trained machine-learning program implements a relatively simple neural network capable of performing, for example, classification and clustering operations. In other examples, the training phase may involve deep learning, in which the training data is unstructured, and the trained machine-learning program implements a DNN that is able to perform both feature extraction and classification/clustering operations.

A neural network generated during the training phase, and implemented within the trained machine-learning program, may include a hierarchical (e.g., layered) organization of neurons. For example, neurons (or nodes) may be arranged hierarchically into a number of layers, including an input layer, an output layer, and multiple hidden layers. Each of the layers within the neural network can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron. In some cases, these neurons implement one or more encoder or decoder networks.

In some examples, the neural network may also be one of a number of different types of neural networks, including a single-layer feed-forward network, an Artificial Neural Network (ANN), a Generative Adversarial Network (GAN), a Recurrent Neural Network (RNN), a symmetrically connected neural network, and unsupervised pre-trained network, a Convolutional Neural Network (CNN), or a Recursive Neural Network (RNN), merely for example.

During prediction phases, the trained machine-learning program is used to perform an assessment.

In some examples, the text access module 410 receives a text document or a query that identifies a text document. The text document can include one or more strings that are structured or unstructured. The query or text document can specify columns of a table that is to be generated. In some cases, the text access module 410 implements a machine learning model (e.g., ANN) that processes the text document to derive columns of the table. For example, the text access module 410 can process words of the text document to determine or estimate the number or quantity of columns of the table that are needed to represent the content of the text document. The text document can be stored by the execution platform 110 and/or can be retrieved from the Internet or online source.

Once the text access module 410 receives the text document and processes initially the text document to determine the column headers of the table and the relationship among the words of the text document, the text access module 410 provides the text document and the column headers to the machine learning module 420. The machine learning module 420 can be trained to process the text document to generate the table including a plurality of entries (or cells) that organizes the plurality of strings into rows and columns over a plurality of iterations. At each of the plurality of iterations, the machine learning module 420 estimates a first value of a first entry of the plurality of entries based on a second value of a second entry of the plurality of entries that has been determined in a prior iteration.

For example, the machine learning module 420 generates a first table instance including a first set of entries based on the plurality of strings and, at a first iteration, generates a first plurality of confidence scores for values in each entry of the first set of entries of the first table instance. The machine learning module 420 selects a first subset of the first set of entries of the first table instance based on the first plurality of confidence scores. The machine learning module 420 retrieves a confidence threshold or selection criterion and compares the first plurality of confidence scores for each entry of the first set of entries of the first table instance to the confidence threshold or selection criterion/criteria. The machine learning module 420 identifies the first subset of the first set of entries that are associated with respective confidence scores that transgress the confidence threshold or satisfy the selection criterion/criteria.

In some examples, the machine learning module 420 generates a second table instance including a second set of entries from the same text document and based on the processed first table instance. The machine learning module 420 does so by, after selecting the first subset of the first set of entries, resetting the values associated with a remaining set of entries that are excluded from the first subset of the first set of entries and retaining the values associated with the first subset of the first set of entries in the second table instance. Then, at a second iteration, the machine learning module 420 processes the second table instance to generate a second plurality of confidence scores for each entry of the second set of entries of the second table instance and selects a second subset of the second set of entries based on the second plurality of confidence scores.

In some examples, the machine learning module 420 compares the second plurality of confidence scores to the confidence threshold or selection criterion. The machine learning module 420 identifies the second subset of the second set of entries that are associated with respective confidence scores that transgress the confidence threshold or satisfy the selection criterion/criteria.

The machine learning module 420 repeats generation of additional table instances until all of the entries of a given table instance are associated with confidence scores that transgress the confidence threshold or satisfy the selection criterion/criteria. In some examples, the machine learning model implemented by the machine learning module 420 is trained based on a corpus of training documents to maximize an expected log likelihood for a training table across all random permutations of a factorization order. In some examples, the machine learning model 420 is trained to populate the plurality of entries of the table in any order in a way that maximizes confidence in each individual entry and reduces error accumulation.

In some cases, the machine learning module 420 is trained based on a corpus of training documents by populating a plurality of training tables representing different permutations of strings in the training documents to maximize an expected log likelihood. In some cases, the machine learning model 420 is trained in a supervised manner and/or in an unsupervised manner.

In some examples, the machine learning module 420 infers one or more values for individual entries of the plurality of entries with words excluded from the plurality of strings based on values of other entries of the plurality of entries. Namely, the machine learning module 420 can predict words that are not present in the text document received from the text access module 410. These predicted words are included and predicted in the final table that is output by the table output module 430 based on other words that are mapped in the table and included in the text document.

For example, instead of generating the cell values for the table in a top-down, left-to-right manner, the machine learning module 420 performs the pretraining by maximizing the expected log-likelihood of the sequence of cell values over all possible prediction orders. Specifically, suppose that the text access module 410 provides a document containing a table with row labels r= and column labels c=($c_1, \ldots, c^M$), which are collectively denoted as h=(r, c). A linear ordering of the table cells can be represented with a bijection $\sigma$: $\{1, 2, \ldots, C\} \to \{1, \ldots, N\} \times \{1, \ldots, M\}$. In this case, C=NM is the number of cells, so that $\sigma(n)=(i,j)$ are the row and column coordinates of the n-th cell in the ordering. Given such cell values v=($v_{ij}$), i<=N,j<=M, the machine learning module 420 factorizes the likelihood of v given h as $$p_\theta(v \mid h) = \prod_{n=1}^{C} p_\theta(v_{\sigma(n)} \mid (v_{\sigma(k)})_{k<n}, h),$$

and using this factorization, the machine learning module 420 maximize the expected log-likelihood $$\frac{1}{C!} \sum_\sigma \sum_{n=1}^{C} \log p_\theta(v_{\sigma(n)} \mid (v_{\sigma(k)})_{k<n},$$

h over $\theta$. The likelihoods $p\theta$ themselves can be factorized according to the standard autoregressive approach as $$p_\theta(v_{\sigma(n)} \mid (v_{\sigma(k)})_{k<n}, h) = \prod_{\ell=1}^{L} p_\theta(v^\ell_{\sigma(n)} \mid (v^i_{\sigma(n)})_{i<\ell}, (v_{\sigma(k)})_{k<n},$$

h where L is the length of $v\sigma_{(n)}$ represented as a sequence of tokens ($v^i\sigma_{(n)}$), i<=L. In practice, the expected log-likelihood is estimated by sampling bijections $\sigma$ at random.

In some examples, raw attention scores $\alpha_{ij}$ for tokens i and j are modified by introducing a bias term: $a'_{ij} = a + \beta_{ij}$ where $\beta_{ij}$=W(ij) is a trainable weight, depending on the relative sequential position of these tokens. The machine learning module 420 modifies the decoder's self-attention by extending it with an additional tabular bias term $$\tau_{ij} = \begin{cases} R(r_i - r_j) + C(c_i - c_j) & \text{if } r_j > 0 \\ R_0 + C(c_i \ c_j) & \text{if } r_j = 0 \end{cases}.$$

In some examples, ($c_i, r_i$) are cell coordinates as given by its 1-based column and row indices (with 0 reserved for the header row/column), and R(k), C(k) and Ro are trainable weights. The special case with $r_j$=0 corresponds to the situation when the key/value token lies in the column header, in which case the machine learning module 420 may use the same bias independent of the row of the query token, due to the different nature of the relation between two cells, and a cell and its column header. After these adjustments, the final attention score takes the form $a'_{ij} = \alpha_{ij} + \beta ij + \tau_{ij}$ where $T_{ij}$ is the bias term defined earlier.

In some examples, the machine learning module 420 decodes the input text received from the text access module 410 based on the following algorithm:

```
procedure OUTERLOOP(k)
    T ← 0_{n,m,l}                              ▷ n × m table with l padding tokens per cell
    C ← 0_{n,m}                                ▷ current cell status (decoded or not)
    while SUM(C) < nm do                       ▷ while there is a cell to decode
        T', L ← INNERLOOP(T, C)                ▷ create complete table candidate T' and cell scores
        B ← OUTERCRITERION(L)                  ▷ sequence of coordinates sorted according to scores
        for c ← 1, k do                        ▷ for k best cells from T"
            i, j ← B_c                         ▷ get coordinates
            T_{i,j} ← T'_{i,j}                 ▷ ...copy values to table T' accordingly
            C_{i,j} ← 1                        ▷ ...and mark the appropriate cell as already decoded
        end for
    end while
    return T
end procedure
procedure INNERLOOP(T, C)
    L ← 0_{n,m}                                ▷ scores for each cell in n × m table
    T' ← T                                     ▷ inner loop's table copy
    parfor : i ← 1, n do                       ▷ for each table row
        parfor j ← 1, m do                     ▷ ...and each table cell processed in parallel
            if C_{i,j} = 0 then                ▷ ...if it was not decoded yet
                s,t ← DECODERMODEL(T, i, j)    ▷ produce cell tokens t and their scores s
                L_{i,j} ← INNERCRITERION(s)    ▷ aggregate per-token scores into cell score
                T'_{i,j} ← i                   ▷ update table copy
            end if
        end parfor
```

```
  end parfor
  return (T', L)
end procedure
procedure INNERCRITERION(s)
  /* Any $\mathbb{R}^n \to \mathbb{R}$ function. STable assumes max, but we test other in the ablation studies. */
end procedure
procedure OUTERCRITERION(L)
  /* Some $\mathbb{R}^{m \times n} \to (\mathbb{N} \times \mathbb{N})^{mn}$ function returning a permutation of indices of the input
  matrix L. STable assumes sort of matrix coordinates according to descending values of its
  elements, but we test other functions in the ablation studies. * /
end procedure
```

This algorithm represents an inner loop that determines each instance of the table and compares the confidence scores of each cell to the threshold or selection criterion/criteria. The outer loop of the algorithm receives the selected subset of cells for which the confidence scores transgress the threshold or satisfy the selection criterion/criteria and uses these selected cells to generate or update cell values of other cells. The inner loop generates each cell autoregressively and independently from other cells. This process can be treated as generating multiple concurrent threads of an answer and can be parallelizable. After the selection of the cell (e.g., based on the comparison of the confidence score to the threshold or selection criterion/criteria), the cell from the inner loop is inserted into the outer loop and is made visible to other cells. The cells that were not selected are reset and continuously generated in future iterations until they are chosen or selected (e.g., have a confidence score that transgresses the threshold or satisfies the selection criterion/criteria).

The machine learning module 420 provides the table that is generated after multiple iterations to the table output module 430. The table output module 430 presents the table to an end user and/or stores the table as part of the execution platform 110, such as in the cloud storage platform 104.

Figure 5:
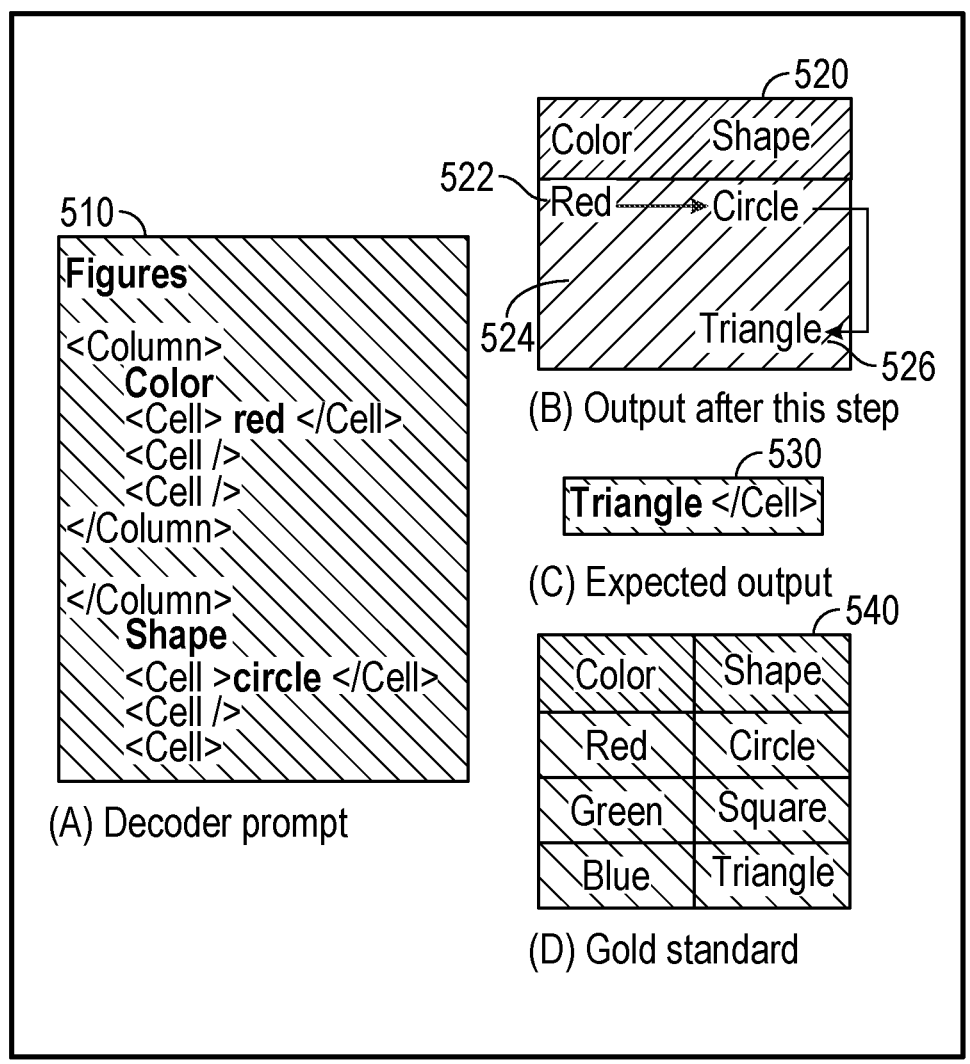
FIGS. 5 and 6 are illustrative outputs of the table generation module, in accordance with some embodiments of the present disclosure.
Figure 6:
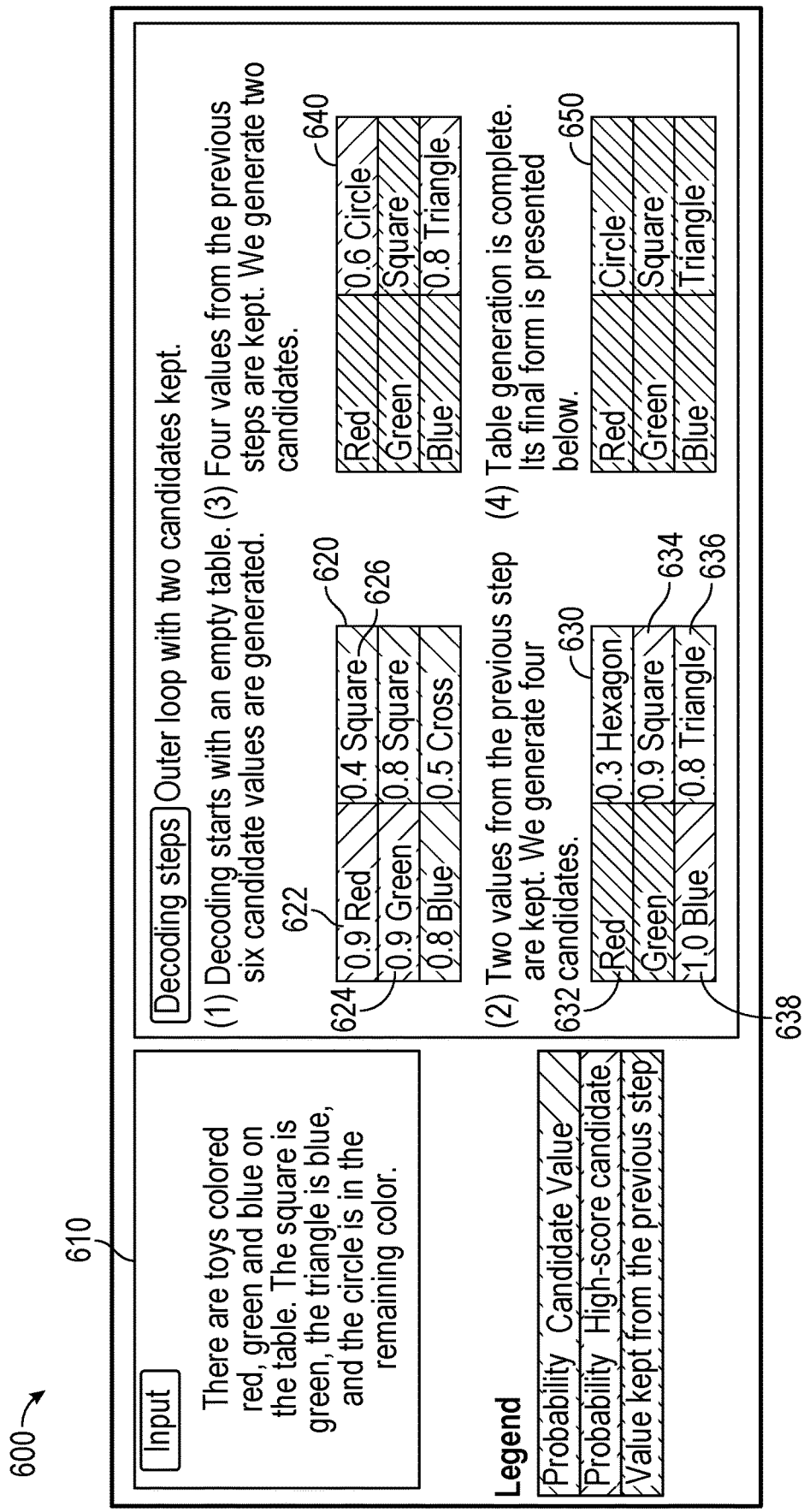

FIGS. 5 and 6 are illustrative outputs 500 and 600 of the table generation module 400, in accordance with some embodiments of the present disclosure. For example, the text access module 410 can receive and process an input text document to generate a decoder prompt 510. The decoder prompt 510 can list various columns (e.g., a color column and a shape column) and the respective cell values (e.g., red and circle) for some of the columns. The decoder prompt 510 is provided to the machine learning module 420 to generate the final table 540. In a first iteration, the machine learning module 420 inserts a first cell value 522 at a particular entry of a first table instance 520 corresponding to a first column (e.g., color column). The machine learning module 420 then predicts the value for a second entry (e.g., circle) corresponding to a second column (e.g., shape column).

Then, rather than populating the next cell 524 under the first cell value 522 (shown as an empty cell), the machine learning module 420 populates the cell 526 with a value. This can be because the cell 526 can be estimated with a relatively higher confidence than the next cell 524. In this case, the machine learning module 420 estimates the value 530 for the cell 526 based on the values of one or more previously determined cells (e.g., first cell value 522 and/or the value for the second entry). This process is repeated until all cell values are determined. Namely, after populating the cell 526, the machine learning module 420 can then populate the next cell 524 and other cells to generate the final table 540.

As shown in the output 600, the text access module 410 can receive a text document 610 that includes one or more strings. Initially, the machine learning module 420 receives the text document 610 (or some initial tabular representation of the text document 610) and generates a first table instance 620. The machine learning module 420 can generate the first table instance 620 in which each cell includes a value and a corresponding confidence score. For example, a first cell includes a first value 624 (e.g., red) and first confidence score 622 (e.g., 0.9), and a second cell 626 includes a second value (e.g., square) and a second confidence score (e.g., 0.4).

Next, the machine learning module 420 compares the confidence scores of each cell or entry to the confidence threshold and/or selection criterion/criteria. In some cases, the confidence threshold can be 0.8 and any confidence score that exceeds 0.8 can be selected. For example, the machine learning module 420 can determine that the first two cells under the first column (e.g., the cells with values red and green) have corresponding confidence scores (e.g., 0.9) that transgress the confidence threshold. In such cases, the machine learning module 420 keeps these cells in the table generated in a second iteration and recalculates and/or clears or resets the values of the remaining cells in the first table instance 620.

At the second iteration, the machine learning module 420 generates a second table instance 630. As shown, the values of the first two cells under the first column have been retained in the second table instance 630 while the other cells have been regenerated with new values and/or new confidence scores. These other cells can be generated based on the locked or retained values of the first two cells under the first column. In this second iteration, the second table instance 630 now includes a cell 638 with a value (e.g., blue) and corresponding confidence score (e.g., 1.0). This confidence score is greater than the confidence score previously computed for this cell 638 in the first table instance 620. Particularly, cell 638 in the first table instance 620 may have had a confidence score of 0.8 because there were no selected or locked cell values. Now that the first two cells above the cell 638 have been locked and determined, the confidence score for the cell 638 has been raised to 1.0.

The cell 634 previously had a value of, for example, square, and now in the second table instance 630 has been recalculated to have a value of, for example, hexagon. This again is because the first two cells 632 have been locked, which can change the estimation or prediction of the value in the cell 634. The machine learning module 420 can process the second table instance 630 to determine that the cell 638 and the cell 636 have confidence scores that transgress the confidence threshold and/or selection criterion/criteria. Based on this, the machine learning module 420 can lock the values of the first two cells under the first column (e.g., from the first iteration) and the values of the cells 638 and 636. In a third iteration, the machine learning module 420 clears out or resets the values of the non-locked or non-selected cells and keeps the values of the locked values to generate a third table instance 640.

As shown, the third table instance 640 includes a new value for the cell 634 (e.g., circle) where previously the value was hexagon in the second iteration and square in the first iteration. As before, the machine learning module 420 processes or compares the confidence scores of the remaining cells in the third table instance 640 to the confidence threshold and/or selection criterion/criteria to select which cell values to keep for a subsequent iteration and which cell values to reset or discard. Once all of the cell values have confidence scores that transgress the confidence threshold and/or selection criterion/criteria, the machine learning module 420 outputs the final table 650 to the table output module 430.

In some cases, after processing all of the cells, the machine learning module 420 can determine that one or more cells are still empty. Namely, the machine learning module 420 may not find any text in the text document that fits into the empty cells. In such cases, the machine learning module 420 can generatively determine or predict text to include in the empty cells. It can do so by identifying the category or column header corresponding to the empty cells. The machine learning module 420 also processes or retrieves data from the row corresponding to the empty cells and their corresponding headers. Using the information from the other cells in the same row, the machine learning module 420 can estimate or predict the value for the empty cell. For example, the empty cell can correspond to or represent citizenship. The other cells in the row can represent a birthplace or location for a person identified in the row. The machine learning module 420 can use the birthplace or location to identify the corresponding country for the birthplace and can infer the content of the empty cell based on the identified country corresponding to the birthplace. In this case, the country of the birthplace was never mentioned in the text document that was received but has been inferred by the machine learning module 420 based on the content of other cells entries determined by the machine learning module 420.

Figure 7:
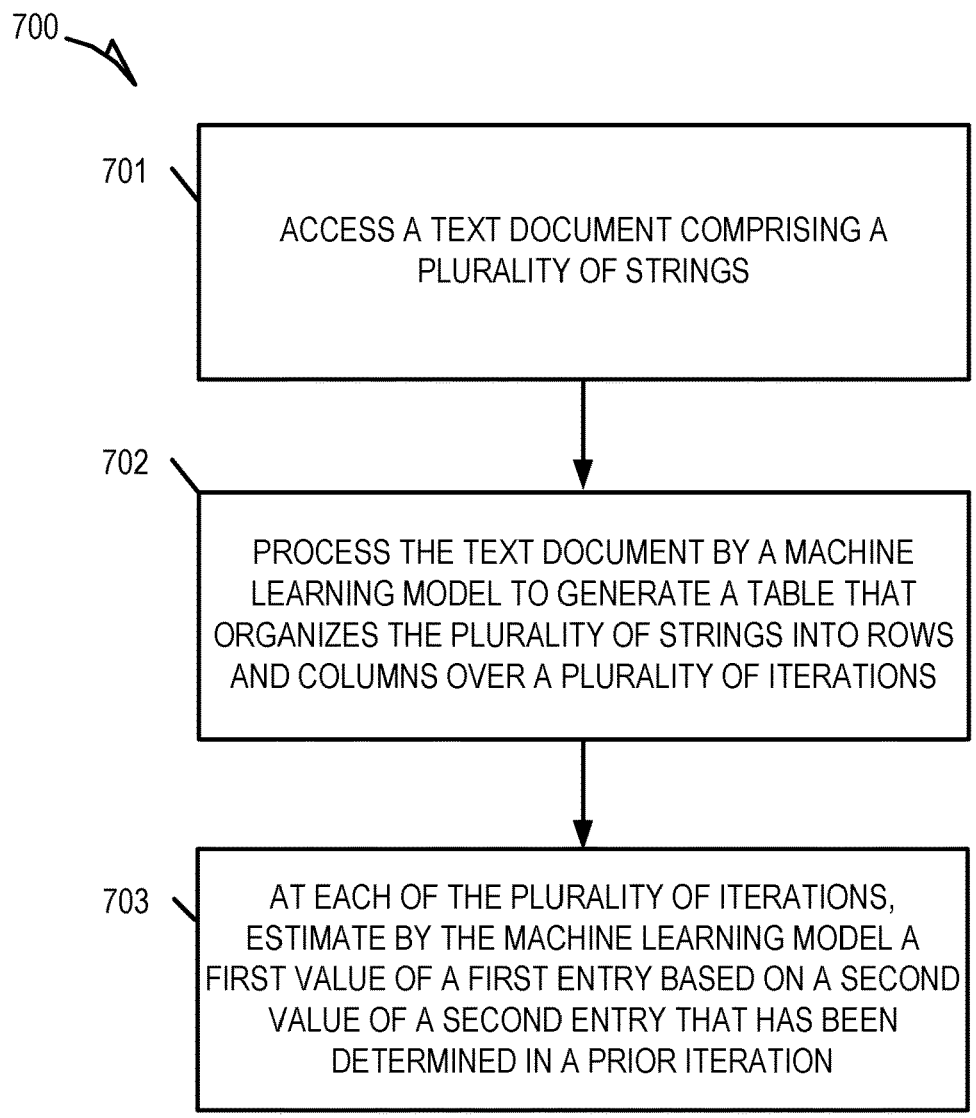
FIG. 7 is a flow diagram illustrating operations of the table generation module, in accordance with some embodiments of the present disclosure.

FIG. 7 is a flow diagram illustrating operations 700 of the table generation module 400, in accordance with some embodiments of the present disclosure. The operations 700 may be embodied in computer-readable instructions for execution by one or more hardware components (e.g., one or more processors) such that the operations of the operations 700 may be performed by components of data platform 102 such as the execution platform 110. Accordingly, the operations 700 is described below, by way of example with reference thereto. However, it shall be appreciated that operations 700 may be deployed on various other hardware configurations and is not intended to be limited to deployment within the data platform 102. Depending on the embodiment, an operation of the operations 700 may be repeated in different ways or involve intervening operations not shown. Though the operations of the operations 700 may be depicted and described in a certain order, the order in which the operations are performed may vary among embodiments, including performing certain operations in parallel or performing sets of operations in separate processes.

At operation 701, the table generation module 400 accesses a text document comprising a plurality of strings, as discussed above.

At operation 702, the table generation module 400 processes the text document by a machine learning model to generate a table comprising a plurality of entries that organizes the plurality of strings into rows and columns over a plurality of iterations, as discussed above.

At operation 703, the table generation module 400, at each of the plurality of iterations, estimates by the machine learning model a first value of a first entry of the plurality of entries based on a second value of a second entry of the plurality of entries that has been determined in a prior iteration, as discussed above.

Described implementations of the subject matter can include one or more features, alone or in combination as illustrated below by way of example.

Example 1. A system comprising: at least one hardware processor; and at least one memory storing instructions that cause the at least one hardware processor to execute operations comprising: accessing a text document comprising a plurality of strings; processing the text document by a machine learning model to generate a table comprising a plurality of entries that organizes the plurality of strings into rows and columns over a plurality of iterations; and at each of the plurality of iterations, estimating by the machine learning model a first value of a first entry of the plurality of entries based on a second value of a second entry of the plurality of entries that has been determined in a prior iteration.

Example 2. The system of Example 1, the operations comprising: receiving a query that indicates values for the columns, wherein the table is generated based on the values indicated for the columns.

Example 3. The system of any one of Examples 1-2, the operations comprising: generating a first table instance comprising a first set of entries based on the plurality of strings; at a first iteration, generating, by the machine learning model, a first plurality of confidence scores for values in each entry of the first set of entries of the first table instance; and selecting a first subset of the first set of entries of the first table instance based on the first plurality of confidence scores.

Example 4. The system of Example 3, the operations comprising: retrieving a confidence threshold; comparing the first plurality of confidence scores for each entry of the first set of entries of the first table instance to the confidence threshold; and identifying the first subset of the first set of entries that are associated with respective confidence scores that transgress the confidence threshold.

Example 5. The system of Example 4, the operations comprising generating a second table instance comprising a second set of entries by: after selecting the first subset of the first set of entries, resetting the values associated with a remaining set of entries that are excluded from the first subset of the first set of entries; and retaining the values associated with the first subset of the first set of entries in the second table instance.

Example 6. The system of Example 5, the operations comprising: at a second iteration, processing the second table instance by the machine learning model, to generate a second plurality of confidence scores for each entry of the second set of entries of the second table instance; and selecting a second subset of the second set of entries based on the second plurality of confidence scores.

Example 7. The system of Example 6, the operations comprising: comparing the second plurality of confidence scores to the confidence threshold; and identifying the second subset of the second set of entries that are associated with respective confidence scores that transgress the confidence threshold.

Example 8. The system of Example 7, the operations comprising: repeating generation of additional table instances until all of the entries of a given table instance are associated with confidence scores that transgress the confidence threshold.

Example 9. The system of any one of Examples 1-8, the operations comprising: training the machine learning model based on a corpus of training documents to maximize an expected log likelihood for a training table across all random permutations of a factorization order.

Example 10. The system of any one of Examples 1-9, wherein the machine learning model is trained to populate the plurality of entries of the table in any order in a way that maximizes confidence in each individual entry and reduces error accumulation.

Example 11. The system of any one of Examples 1-10, the operations comprising: training the machine learning model based on a corpus of training documents by populating a plurality of training tables representing different permutations of strings in the training documents to maximize an expected log likelihood.

Example 12. The system of any one of Examples 1-11, the machine learning model being trained in a supervised or unsupervised manner.

Example 13. The system of any one of Examples 1-12, wherein the machine learning model estimates column headers of the table.

Example 14. The system of any one of Examples 1-13, the operations comprising: inferring one or more values for individual entries of the plurality of entries with words excluded from the plurality of strings based on values of other entries of the plurality of entries.

Figure 8:
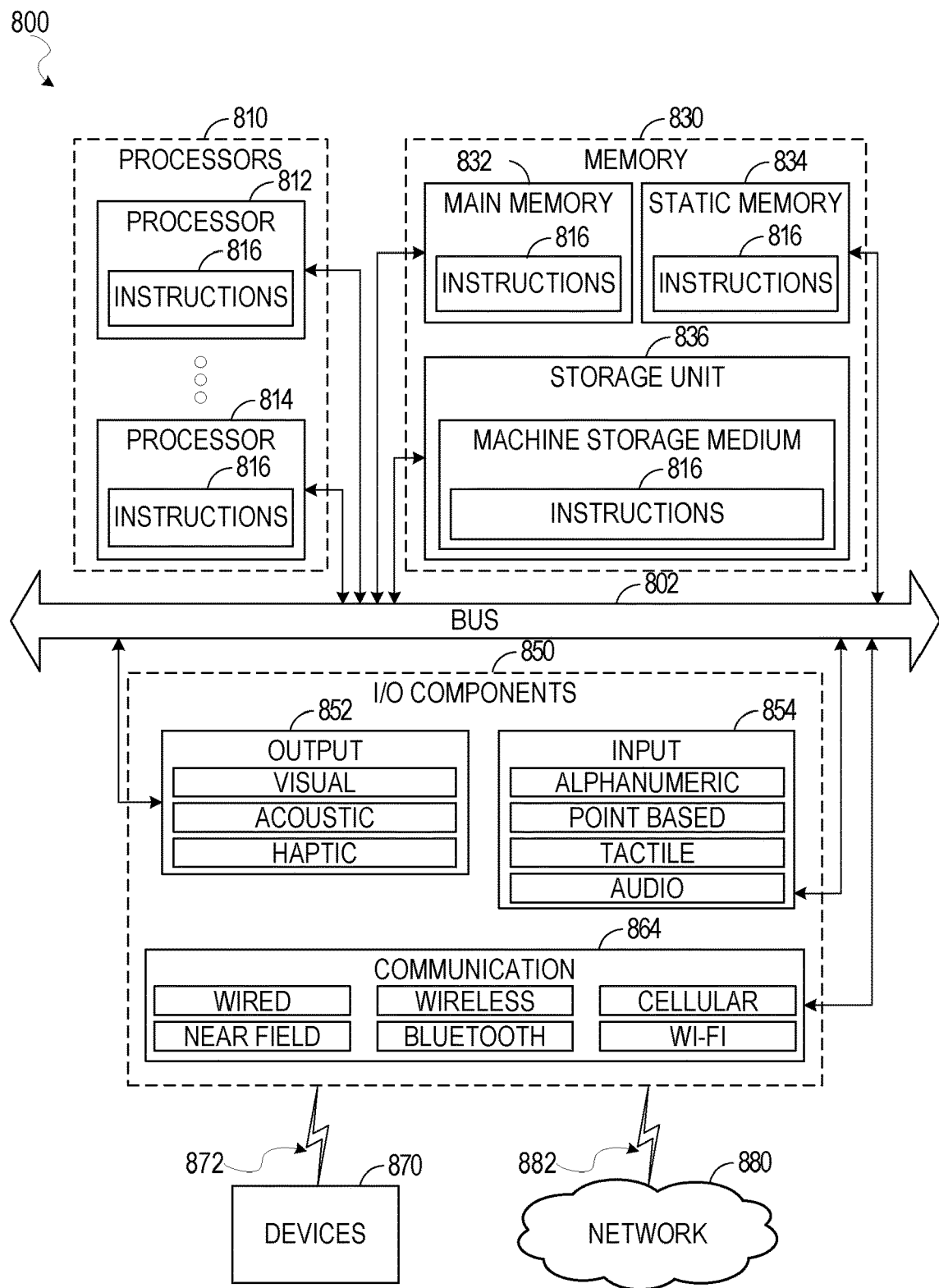
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of the above processes (e.g., operations 700). In this way, the instructions 816 transform a general, non-programmed machine into a particular machine 800 (e.g., the compute service manager 108 or one or more execution nodes of the execution platform 110) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the compute service manager 108, the execution platform 110, and the devices 870 may include any other computing device described herein as being in communication with the data platform 102.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple transitory or non-transitory storage devices and/or media (e.g., a centralized or distributed database, and/or associated caches and servers) that store executable transitory or non-transitory instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the process or operations 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments.

Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to execute operations comprising:
   accessing a text document comprising a plurality of strings that are unstructured, the plurality of strings forming one or more sentences;
   processing the text document by a machine learning model to generate a table that organizes words of the one or more sentences of the plurality of strings that are unstructured into rows and columns over a plurality of iterations, the table comprising a plurality of entries, each entry comprising at least one of the words of the one or more sentences;
   at each of the plurality of iterations, estimating by the machine learning model a first value of a first entry of the plurality of entries based on a second value of a second entry of the plurality of entries that has been determined in a prior iterations identifying a first cell in the table populated with a first word of the words of the one or more sentences; and
   populating a second cell that is at a position that is non-adjacent relative to a position of the first cell with a second word of the words of the one or more sentences rather than populating the second word in a third cell that is adjacent next to or underneath the first cell, the third cell being left empty in response to populating the second cell.

2. The system of claim 1,
   wherein the second cell that is at a diagonal relative to the position of the first cell.

3. The system of claim 1, the operations comprising:
   generating a first table instance comprising a first set of entries based on the plurality of strings;
   at a first iteration, generating, by the machine learning model, a first plurality of confidence scores for values in each entry of the first set of entries of the first table instance; and
   selecting a first subset of the first set of entries of the first table instance based on the first plurality of confidence scores.

4. The system of claim 3, the operations comprising:
   retrieving a confidence threshold;
   comparing the first plurality of confidence scores for each entry of the first set of entries of the first table instance to the confidence threshold; and
   identifying the first subset of the first set of entries that are associated with respective confidence scores that transgress the confidence threshold.

5. The system of claim 4, the operations comprising generating a second table instance comprising a second set of entries by:
   after selecting the first subset of the first set of entries, resetting the values associated with a remaining set of entries that are excluded from the first subset of the first set of entries; and
   retaining the values associated with the first subset of the first set of entries in the second table instance.

6. The system of claim 5, the operations comprising:
   at a second iteration, processing the second table instance by the machine learning model, to generate a second plurality of confidence scores for each entry of the second set of entries of the second table instance; and
   selecting a second subset of the second set of entries based on the second plurality of confidence scores.

7. The system of claim 6, the operations comprising:
   comparing the second plurality of confidence scores to the confidence threshold; and
   identifying the second subset of the second set of entries that are associated with respective confidence scores that transgress the confidence threshold.

8. The system of claim 7, the operations comprising:
   repeating generation of additional table instances until all entries of a given table instance are associated with confidence scores that transgress the confidence threshold.

9. The system of claim 1, the operations comprising:
   training the machine learning model based on a corpus of training documents to maximize an expected log likelihood for a training table across all random permutations of a factorization order.

10. The system of claim 1, wherein the machine learning model is trained to populate the plurality of entries of the table in any order in a way that maximizes confidence in each individual entry and reduces error accumulation.

11. The system of claim 1, the operations comprising:
training the machine learning model based on a corpus of training documents by populating a plurality of training tables representing different permutations of strings in the training documents to maximize an expected log likelihood.

12. The system of claim 1, the machine learning model generatively predicting text to include in an empty cell of the table by performing operations comprising:
identifying a category or column header corresponding to the empty cell;
processing data from a row corresponding to the empty cell and corresponding headers of each populated entry from the row corresponding to the empty cell; and
using information from other cells in the row corresponding to the empty cell to estimate or predict the text to include in the empty cell.

13. The system of claim 1, wherein the machine learning model estimates column headers of the table.

14. The system of claim 1, the operations comprising:
inferring one or more values for individual entries of the plurality of entries with words excluded from the plurality of strings based on values of other entries of the plurality of entries, and
populating an individual entry of the plurality of entries of the table using the inferred one or more values without retrieving values from the text document.

15. A method comprising:
accessing a text document comprising a plurality of strings that are unstructured, the plurality of strings forming one or more sentences;
processing the text document by a machine learning model to generate a table that organizes words of the one or more sentences of the plurality of strings that are unstructured into rows and columns over a plurality of iterations, the table comprising a plurality of entries, each entry comprising at least one of the words of the one or more sentences;
at each of the plurality of iterations, estimating by the machine learning model a first value of a first entry of the plurality of entries based on a second value of a second entry of the plurality of entries that has been determined in a prior iterations identifying a first cell in the table populated with a first word of the words of the one or more sentences; and
populating a second cell that is at a position that is non-adjacent relative to a position of the first cell with a second word of the words of the one or more sentences rather than populating the second word in a third cell that is adjacent next to or underneath the first cell, the third cell being left empty in response to populating the second cell.

16. The method of claim 15, further comprising:
receiving a query that indicates values for the columns, wherein the table is generated based on the values indicated for the columns.

17. The method of claim 15, further comprising:
generating a first table instance comprising a first set of entries based on the plurality of strings;
at a first iteration, generating, by the machine learning model, a first plurality of confidence scores for values in each entry of the first set of entries of the first table instance; and
selecting a first subset of the first set of entries of the first table instance based on the first plurality of confidence scores.

18. The method of claim 17, further comprising:
retrieving a confidence threshold;
comparing the first plurality of confidence scores for each entry of the first set of entries of the first table instance to the confidence threshold; and
identifying the first subset of the first set of entries that are associated with respective confidence scores that transgress the confidence threshold.

19. The method of claim 18, further comprising generating a second table instance comprising a second set of entries by:
after selecting the first subset of the first set of entries, resetting the values associated with a remaining set of entries that are excluded from the first subset of the first set of entries; and
retaining the values associated with the first subset of the first set of entries in the second table instance.

20. The method of claim 19, further comprising:
at a second iteration, processing the second table instance by the machine learning model, to generate a second plurality of confidence scores for each entry of the second set of entries of the second table instance; and
selecting a second subset of the second set of entries based on the second plurality of confidence scores.

21. The method of claim 20, further comprising:
comparing the second plurality of confidence scores to the confidence threshold; and
identifying the second subset of the second set of entries that are associated with respective confidence scores that transgress the confidence threshold.

22. The method of claim 21, further comprising:
repeating generation of additional table instances until all entries of a given table instance are associated with confidence scores that transgress the confidence threshold.

23. A non-transitory computer-storage medium comprising instructions that, when executed by a processor of a machine, configure the machine to perform operations comprising:
accessing a text document comprising a plurality of strings that are unstructured, the plurality of strings forming one or more sentences;
processing the text document by a machine learning model to generate a table that organizes words of the one or more sentences of the plurality of strings that are unstructured into rows and columns over a plurality of iterations, the table comprising a plurality of entries, each entry comprising at least one of the words of the one or more sentences;
at each of the plurality of iterations, estimating by the machine learning model a first value of a first entry of the plurality of entries based on a second value of a second entry of the plurality of entries that has been determined in a prior iterations identifying a first cell in the table populated with a first word of the words of the one or more sentences; and
populating a second cell that is at a position that is non-adjacent relative to a position of the first cell with a second word of the words of the one or more sentences rather than populating the second word in a third cell that is adjacent next to or underneath the first cell, the third cell being left empty in response to populating the second cell.

24. The non-transitory computer-storage medium of claim 23, the operations comprising:
- selecting, at an individual iteration, a first subset of a first set of entries of a first table instance based on a first plurality of confidence scores;
- after selecting the first subset of the first set of entries, resetting values stored in the first table instance associated with a remaining set of entries that are excluded from the first subset of the first set of entries; and
- retaining values associated with the first subset of the first set of entries in a second table instance.

25. The non-transitory computer-storage medium of claim 23, the operations comprising:
- generating a first table instance comprising a first set of entries based on the plurality of strings;
- at a first iteration, generating, by the machine learning model, a first plurality of confidence scores for values in each entry of the first set of entries of the first table instance; and
- selecting a first subset of the first set of entries of the first table instance based on the first plurality of confidence scores.

26. The non-transitory computer-storage medium of claim 25, the operations comprising:
- retrieving a confidence threshold;
- comparing the first plurality of confidence scores for each entry of the first set of entries of the first table instance to the confidence threshold; and
- identifying the first subset of the first set of entries that are associated with respective confidence scores that transgress the confidence threshold.

27. The non-transitory computer-storage medium of claim 26, the operations comprising generating a second table instance comprising a second set of entries by:
- after selecting the first subset of the first set of entries, resetting the values associated with a remaining set of entries that are excluded from the first subset of the first set of entries; and
- retaining the values associated with the first subset of the first set of entries in the second table instance.

28. The non-transitory computer-storage medium of claim 27, the operations comprising:
- at a second iteration, processing the second table instance by the machine learning model to generate a second plurality of confidence scores for each entry of the second set of entries of the second table instance; and
- selecting a second subset of the second set of entries based on the second plurality of confidence scores.

29. The non-transitory computer-storage medium of claim 28, the operations comprising:
- comparing the second plurality of confidence scores to the confidence threshold; and
- identifying the second subset of the second set of entries that are associated with respective confidence scores that transgress the confidence threshold.

30. The non-transitory computer-storage medium of claim 29, the operations comprising:
- repeating generation of additional table instances until all entries of a given table instance are associated with confidence scores that transgress the confidence threshold.

* * * * *